(12) United States Patent
Takeda et al.

(10) Patent No.: US 12,339,234 B2
(45) Date of Patent: Jun. 24, 2025

(54) LASER ANALYSIS DEVICE

(71) Applicant: HORIBA, Ltd., Kyoto (JP)

(72) Inventors: Aya Takeda, Kyoto (JP); Seiji Higuchi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 518 days.

(21) Appl. No.: 17/755,747

(22) PCT Filed: Nov. 6, 2020

(86) PCT No.: PCT/JP2020/041491
§ 371 (c)(1),
(2) Date: May 6, 2022

(87) PCT Pub. No.: WO2021/090908
PCT Pub. Date: May 14, 2021

(65) Prior Publication Data
US 2022/0390373 A1    Dec. 8, 2022

(30) Foreign Application Priority Data

Nov. 8, 2019  (JP) .................................. 2019-202915

(51) Int. Cl.
*G01N 21/65* (2006.01)
*G01J 1/02* (2006.01)
(Continued)

(52) U.S. Cl.
CPC ............ *G01N 21/65* (2013.01); *G01J 3/0291* (2013.01); *G01J 3/44* (2013.01); *G01J 2001/0285* (2013.01); *G01N 2201/022* (2013.01)

(58) Field of Classification Search
CPC ............. G01N 21/65; G01N 2201/022; G01N 2201/0227; G01N 2201/0646;
(Continued)

(56) References Cited

U.S. PATENT DOCUMENTS 4,589,731 A * 5/1986 Taniguchi ............ H04N 1/0281
359/896
6,069,690 A * 5/2000 Xu ............................ G01J 3/44
356/73
(Continued)

FOREIGN PATENT DOCUMENTS

CN     102384924 A     3/2012
CN     206910601 U     1/2018
(Continued)

OTHER PUBLICATIONS

Extended European Search Report dated Nov. 3, 2023, for the corresponding European Application No. 20884221.1.
(Continued)

*Primary Examiner* — Kara E. Geisel
*Assistant Examiner* — Roberto Fabian, Jr.
(74) *Attorney, Agent, or Firm* — LUCAS & MERCANTI, LLP

(57) ABSTRACT

A laser analysis device includes a laser analysis unit that a sample is irradiated with laser light, a cover that covers a periphery of the laser analysis unit, so as to prevent the laser light from being emitted to outside, and has a slit in at least a part of the cover, a fastener configured to open and close the slit, and an interlock mechanism including a key provided on the fastener and a detector that detects a state in which the fastener is fully closed, in which in a state where the detector has detected that the fastener is fully closed, laser light having a predetermined intensity or more is introduced into the laser analysis unit.

8 Claims, 7 Drawing Sheets

(51) Int. Cl.
*G01J 3/02* (2006.01)
*G01J 3/44* (2006.01)

(58) Field of Classification Search
CPC .... G01J 3/0291; G01J 3/44; G01J 2001/0285; G01J 1/02; G01J 3/027; G01J 3/0275; G01Q 30/02
See application file for complete search history.

(56) References Cited

U.S. PATENT DOCUMENTS

| | | | |
|---|---|---|---|
| 8,611,493 B2 * | 12/2013 | Hasegawa | G01N 23/223 378/44 |
| 10,054,483 B1 * | 8/2018 | Workman, Jr. | G01J 3/28 |
| 10,598,691 B2 * | 3/2020 | Watanabe | G01Q 10/065 |
| 2008/0192888 A1 | 8/2008 | Iwamoto et al. | |
| 2008/0260243 A1 * | 10/2008 | Occelli | G01J 3/462 382/165 |
| 2014/0118732 A1 | 5/2014 | Ayers | |
| 2017/0043041 A1 * | 2/2017 | Wang | A61K 49/08 |
| 2017/0148102 A1 * | 5/2017 | Franke | G06Q 30/0601 |
| 2019/0331711 A1 | 10/2019 | Watanabe et al. | |

FOREIGN PATENT DOCUMENTS

| | | |
|---|---|---|
| CN | 209311315 U | 8/2019 |
| CN | 110398613 A | 11/2019 |
| JP | 06-336266 A | 12/1994 |
| JP | H08-507953 A | 8/1996 |
| JP | 2000-109159 A | 4/2000 |
| JP | 3079005 U | 8/2001 |
| JP | 2008029119 A * | 2/2008 |
| JP | 2009188128 A * | 8/2009 |
| JP | 2013-524206 A | 6/2013 |
| JP | 2013-143811 A | 7/2013 |
| JP | 2015-198937 A | 11/2015 |
| JP | 2019-190985 A | 10/2019 |
| WO | 1995/019118 A1 | 7/1995 |
| WO | 2011/121549 A1 | 10/2011 |
| WO | WO-2021202433 A1 * | 10/2021 ........... A61B 5/0064 |

OTHER PUBLICATIONS

PCT, International Search Report for the corresponding application No. PCT/JP2020/041491, dated Jan. 26, 2021, with English translation.

"Safety of laser products," Japanese Industrial Standard JIS C 6802: 2014, Sep. 22, 2014, pp. 38-40, Japanese Standards Association, with English translation.

Office Action, dated Oct. 9, 2024, issued for the corresponding Chinese Patent Application No. 202080076865.X, 14 pages, with English translation.

Office Action, dated Oct. 15, 2024, issued for the corresponding Japanese Patent Application No. 2021-555120, 9 pages, with English translation.

Second Office Action dated Mar. 28, 2025 issued in CN patent application No. 202080076865.X, with English translation, 16 pages.

* cited by examiner

LASER ANALYSIS DEVICE

CROSS REFERENCE TO RELATED APPLICATION

This Application is a 371 of PCT/JP2020/041491 filed on Nov. 6, 2020, which, in turn, claimed the priority of Japanese Patent Application No. 2019-202915 filed on Nov. 8, 2019, and both applications are incorporated herein by reference.

TECHNICAL FIELD

The present invention relates to a laser analysis device that a sample is irradiated with laser light.

BACKGROUND ART

In various analyses such as Raman spectroscopy, for example, a sample is irradiated with laser light, and the sample is analyzed by detecting scattered light, transmitted light, and reflected light of the laser light.

When laser light having a high energy density is incident on the eye of an operator of a laser analysis device, there is a possibility that visual acuity decreases or blindness occurs. For this reason, for example, the Japanese Industrial Standards provide a plurality of safety classes for products that emit laser light. Among the safety classes, in order to satisfy the standard of safety class 1 (inherently safe), for example, a protective housing should be provided in order to prevent exposure of the human body to laser light including a stray laser. In a case where a door of the protective housing is provided to access a device in the protective housing, it is necessary to provide an interlock mechanism such that laser light having a predetermined intensity or more is emitted only when it is detected that the door is closed (See Non Patent Literature 1).

Specifically, as disclosed in Patent Literature 1, a conventional laser analysis device includes a box-shaped protective housing including resin or sheet metal that houses an entire optical path of laser light inside. The protective housing includes a body, a door provided on the body to openable and closable, and a door detector provided in an opening of the body so as to be in contact with the door only in a state where the door is closed, and constituting an interlock mechanism.

However, when the door of the protective housing having the above configuration is opened or closed, an impact may occur, an optical system inside is displaced, and an analysis error or the like may occur.

CITATION LIST

Patent Literature

Patent Literature 1: JP 2009-188128 A

Non Patent Literature

Non Patent Literature 1: Japanese Industrial Standards, JIS C 6802

SUMMARY OF INVENTION

Technical Problem

The present invention has been made in view of the above problems, and provides a laser analysis device configured such that a protection mechanism for preventing exposure to a human body can be opened and closed so as not to greatly impact a laser optical system.

Solution to Problem

That is, a laser analysis device of the present invention includes a laser analysis unit that a sample is irradiated with laser light, a cover that covers a periphery of the laser analysis unit so as to prevent the laser light from being emitted to outside, and has a slit in at least a part of the cover, a fastener configured to open and close the slit, and an interlock mechanism including a detector that detects a state in which the fastener is fully closed, in which in a state where the detector has detected that the fastener is fully closed, laser light having a predetermined intensity or more is introduced into the laser analysis unit.

This configuration allows the slit of the cover covering the laser analysis unit to be fully closed by moving the slider of the fastener, and thus impact is less likely to occur when the slit is fully closed. It is therefore possible to prevent occurrence of an error in an analysis result of the sample because of displacement in the laser analysis unit or the laser optical system connected to the laser analysis unit with the cover configured to be openable and closable.

Only by moving the slider of the fastener to the fully closed position, all the elements (teeth) of the fastener mesh with each other, and the slit can be easily closed without a gap. Furthermore, since the state in which the fastener is fully closed is detected, the interlock is released only when there is no opening in the cover and there is no possibility that laser light is emitted from the laser analysis unit to outside. It is also possible to easily confirm, for example, visually that the elements are continuously closed from one end to the other end only by closing the fastener.

For example, in order to prevent an impact from occurring even when the cover is in direct contact with the laser analysis unit at time of opening and closing the slit or the like, the cover only needs to be formed of a flexible material. Since the cover has flexibility, an operator can easily access the laser analysis unit by increasing an opening area of the slit or rolling up the cover when the fastener is opened.

For example, in a case where it is detected that the fastener is fully closed due to contact of the slider of the fastener or a key provided on the slider with the detector, the laser analysis unit only needs to be placed on a surface plate, and the detector only needs to be placed on the surface plate as a separate body from the laser analysis unit in order to make slight vibration due to contact with the detector less likely to affect the laser analysis unit. Since the detector is not provided in the laser analysis unit, the laser analysis unit is less likely to receive a force when the fastener is fully closed and the interlock is released. Since the laser analysis unit is placed on the surface plate, even in a case where the optical system is constituted by a plurality of divided parts, it is possible to make the displacement less likely to occur and reduce the displacement as the optical system.

For example, in order to easily roll up the cover to form a large opening for accessing the laser analysis unit, the cover only needs to have the slit extending in an up-down direction at a plurality of locations, and the slit only needs to be respectively provided with the fastener.

In a specific configuration example of the laser analysis unit preferable to the present invention, the laser analysis unit includes at least one opening that communicates with outside from a point where a sample is irradiated with laser light.

In an analysis or the like using a laser, after a sample is placed at a predetermined place, it may be desired to surround a periphery of the sample with a shielding object such that an ambient airflow and light do not affect the analysis. However, in a case where the housing is provided with a door in which a shielding object includes a metal plate or the like as in the related art, there is a possibility that a displacement occurs in a measurement system such as an optical system due to vibration generated when the door is closed, or the sample is affected by the vibration, and thus an error occurs in the analysis. In order to solve the above problem, a laser analysis device may include a laser analysis unit that a sample is irradiated with laser light, and a cover that has flexibility, covers a periphery of the laser analysis unit near the laser analysis unit so as to prevent the laser light from being emitted to outside, and has a slit in at least a part of the laser analysis unit.

This configuration can prevent light or an airflow from entering the laser analysis unit from outside or prevent laser light from leaking to outside only by closing the cover having flexibility near the laser analysis unit. Furthermore, since only the cover having flexibility is closed, vibration that adversely affects analysis is unlikely to occur in the first place. For these reasons, it is not necessary to provide a large-scale mechanism for taking measure against vibration, and it is possible to achieve a user-friendly laser analysis device with a compact device configuration.

As one of preferred embodiments of the laser analysis device of the present invention, the laser analysis unit further includes a probe disposed to be in contact with or in proximity to the sample.

Advantageous Effects of Invention

As described above, in the laser analysis device of the present invention, since the fastener is provided on the slit of the cover, it is possible to completely close a gap of the cover without greatly impacting the laser optical system by moving the slider to a fully closed position. It is therefore possible to reduce the analysis error caused by an error of the laser optical system due to the impact as compared with the related art while satisfying various safety standards.

Figure 1:
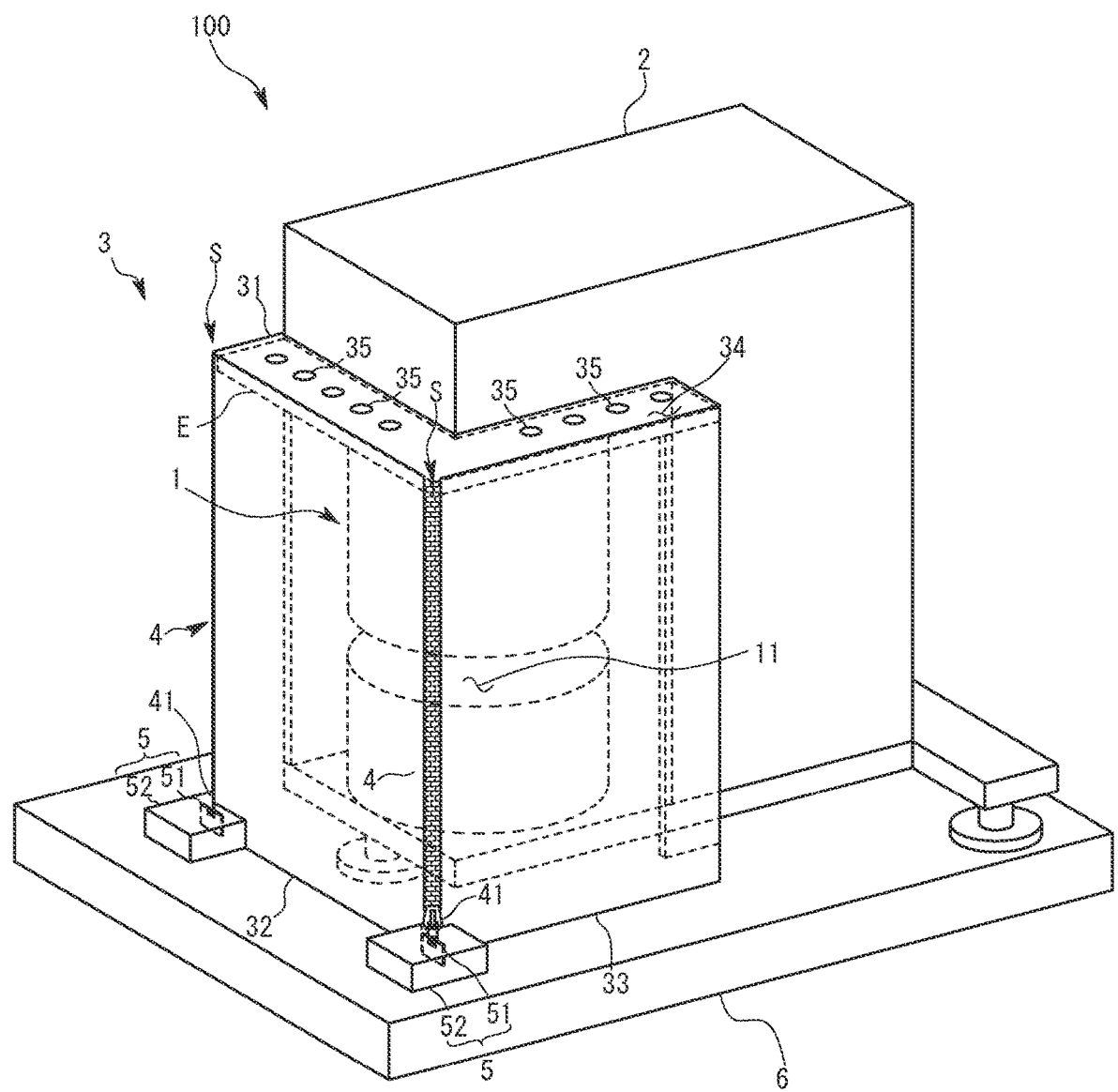
FIG. 1 is a schematic diagram of a laser analysis device according to an embodiment of the present invention.

REFERENCE SIGNS LIST 100 laser analysis device
1 laser analysis unit
12 probe
2 optical system container
3 cover
31 strip shield
32 front shield
33 side shield
34 fixed end
35 screw
4 fastener
41 slider
5 interlock mechanism
51 key
52 detector

DESCRIPTION OF EMBODIMENTS

An embodiment of the present invention will be described with reference to FIGS. 1 to 5.

A laser analysis device 100 according to the embodiment is a nanoimaging spectroscopic device capable of simultaneously performing high-speed mapping of atomic force microscope (AFM) measurement and Raman spectrometry.

The laser analysis device 100 is housed in a glove box (not illustrated), and is configured such that an operator operates each unit from outside of the glove box.

Specifically, as illustrated in FIG. 1, the laser analysis device 100 includes a laser analysis unit 1 that a sample W is irradiated with laser light and detects scattered light, reflected light, and the like, an optical system container 2 that houses a laser optical system that guides the laser light to the laser analysis unit 1 or guides light detected by the laser analysis unit 1 to outside in a state of being sealed inside, and a cover 3 that covers a periphery of the laser analysis unit 1 in order to shield the laser light that may be emitted to outside from an opening 11 of the laser analysis unit 1.

Each unit will be described in detail.

Figure 2:
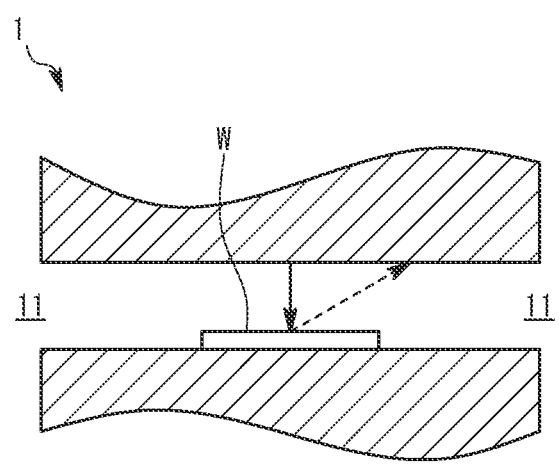
FIG. 2 is a schematic sectional view illustrating a structure of a laser analysis unit according to the embodiment.

As illustrated in FIGS. 1 and 2, the laser analysis unit 1 has a substantially cylindrical shape, and the sample W is irradiated with laser light inside, and secondary light such as scattered light and reflected light thus generated is detected. The laser analysis unit 1 includes the opening 11 for arranging the sample W at a laser irradiation position. The laser that has become stray light may reach the opening 11 from inside to outside. In the embodiment, a back surface of the laser analysis unit 1 in FIG. 1 is covered with a housing of the optical system container 2, and this section is configured such that the laser light that has become stray light is not emitted to outside.

Figure 3:
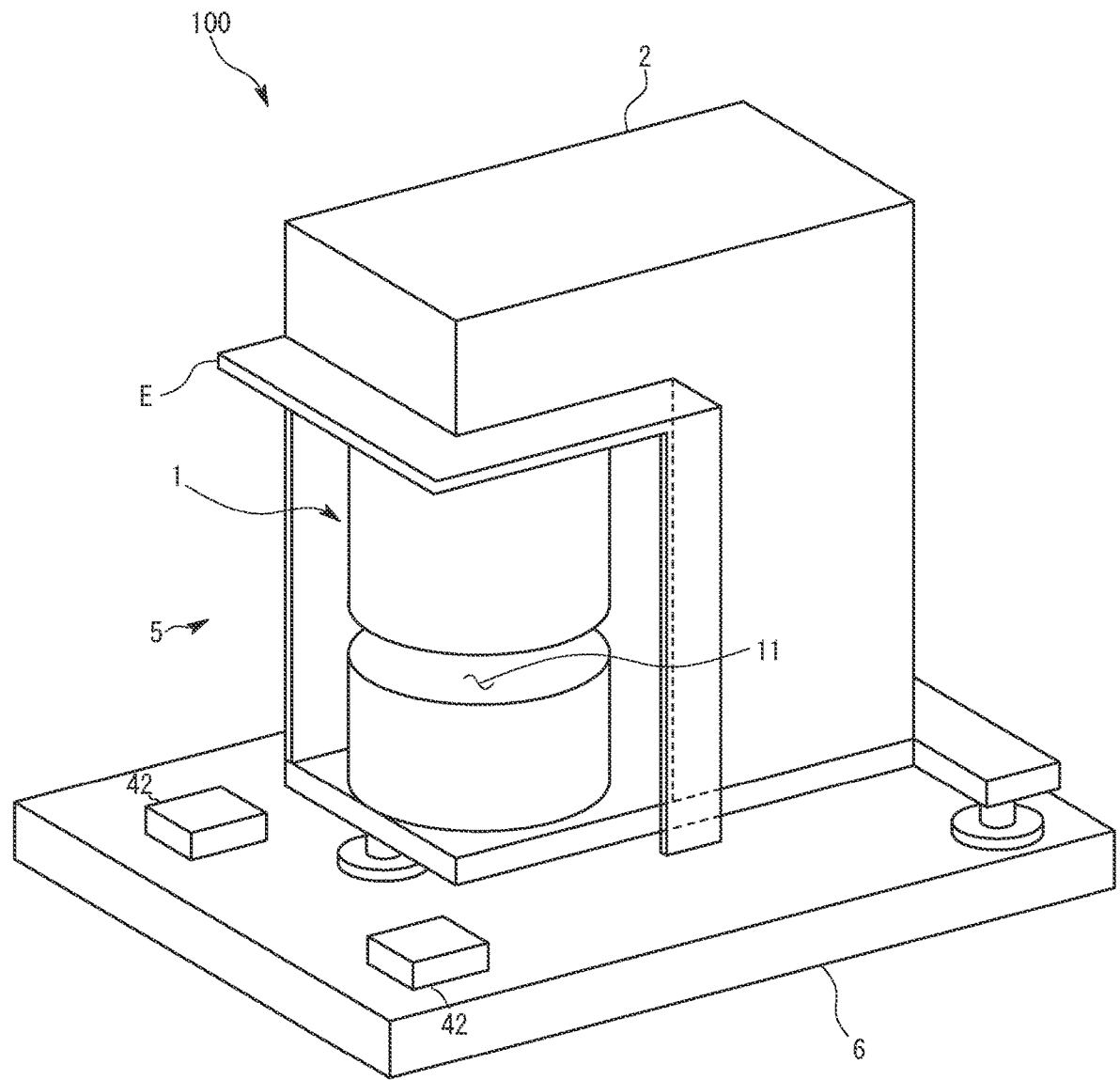
FIG. 3 is a schematic view of the laser analysis device according to the embodiment with a cover being removed.

As illustrated in FIGS. 1 and 3, in the embodiment, the cover 3 covers a periphery of a section not covered by the optical system container 2 in the laser analysis unit 1. Specifically, the cover 3 is configured by hanging a black shielding cloth having a plurality of rectangular portions in an up-down manner. This black shield is a cloth, has flexibility, and can be deformed freely.

In the embodiment, the cover 3 includes a strip shield 31 that covers a part of the back surface, a front shield 32 that covers a front surface of the laser analysis device 100, a side shield 33 that covers a side surface of the laser analysis device 100, and a fixed end 34 that makes roots of the shields common and is fixed to a flange E protruding in a horizontal direction from the housing of the optical system container 2.

The strip shield 31 and the front shield 32 are disposed so as to be substantially orthogonal to each other to form a corner. The front shield 32 and the side shield 33 are also disposed so as to be substantially orthogonal to each other to form a corner. A slit S extending in the vertical direction is formed at each of the corners, and a fastener 4 extending in an up-down direction is provided in each slit S. The fixed end 34 is fixed to the flange E by a screw 35 so as not to be removed from the flange E without using a tool. By fixing the cover 3 in this manner, for example, one of the requirements of safety class 1 of the laser device in the Japanese Industrial Standards can be satisfied.

By moving a slider 41 of each fastener 4 downward, elements of the fastener 4 meshes with each other to close the slit S without a gap. In the embodiment, by moving the slider 41 of each fastener 4 to a lower end, all the slits S can be completely closed without a gap as illustrated in FIG. 1, and a sealed state can be achieved in which the laser light or the like that has become stray light is not emitted from the laser analysis unit 1 to outside.

Figure 4:
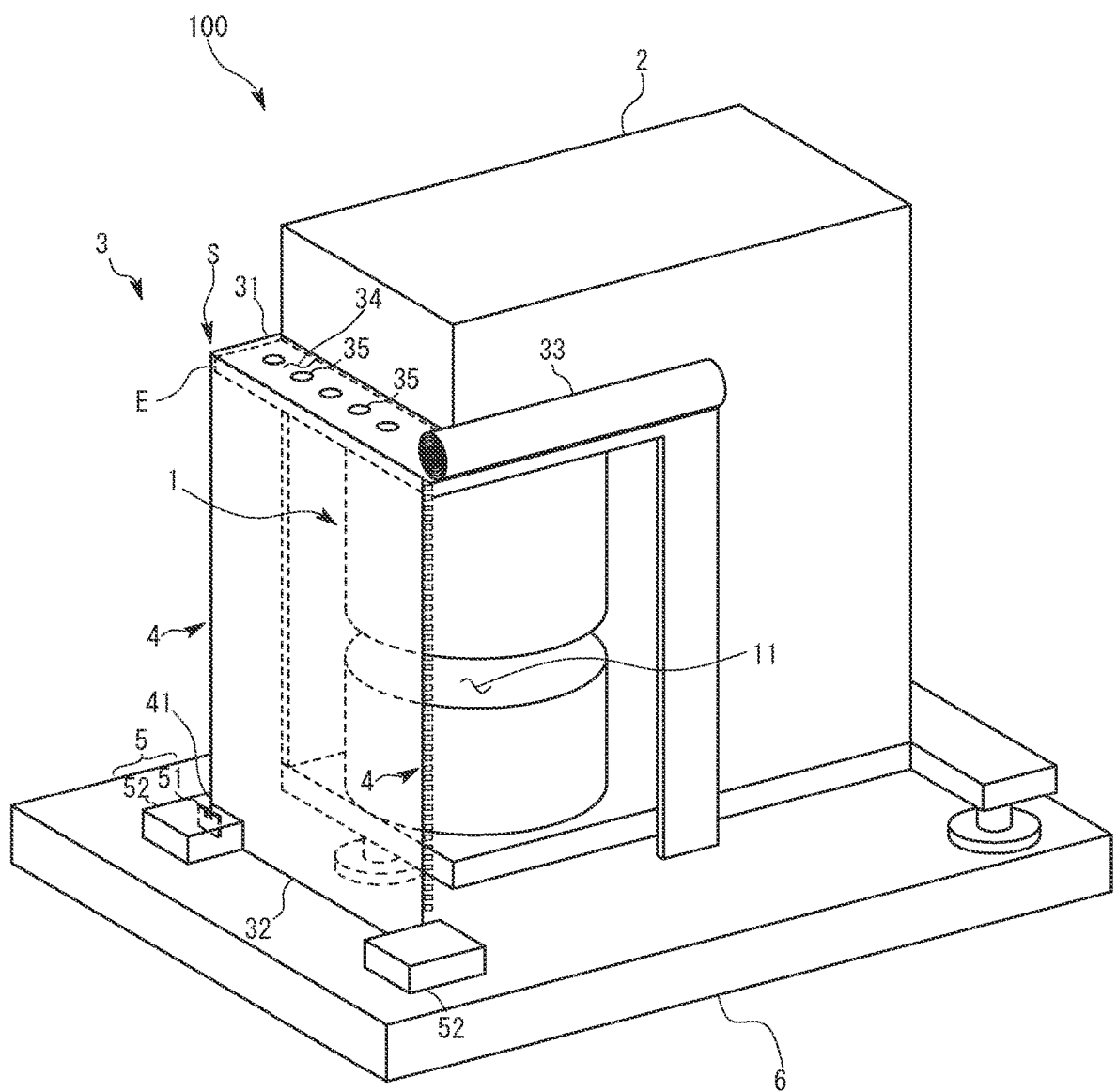
FIG. 4 is a schematic view of the laser analysis device according to the embodiment with a part of the cover rolled up.
Figure 5:
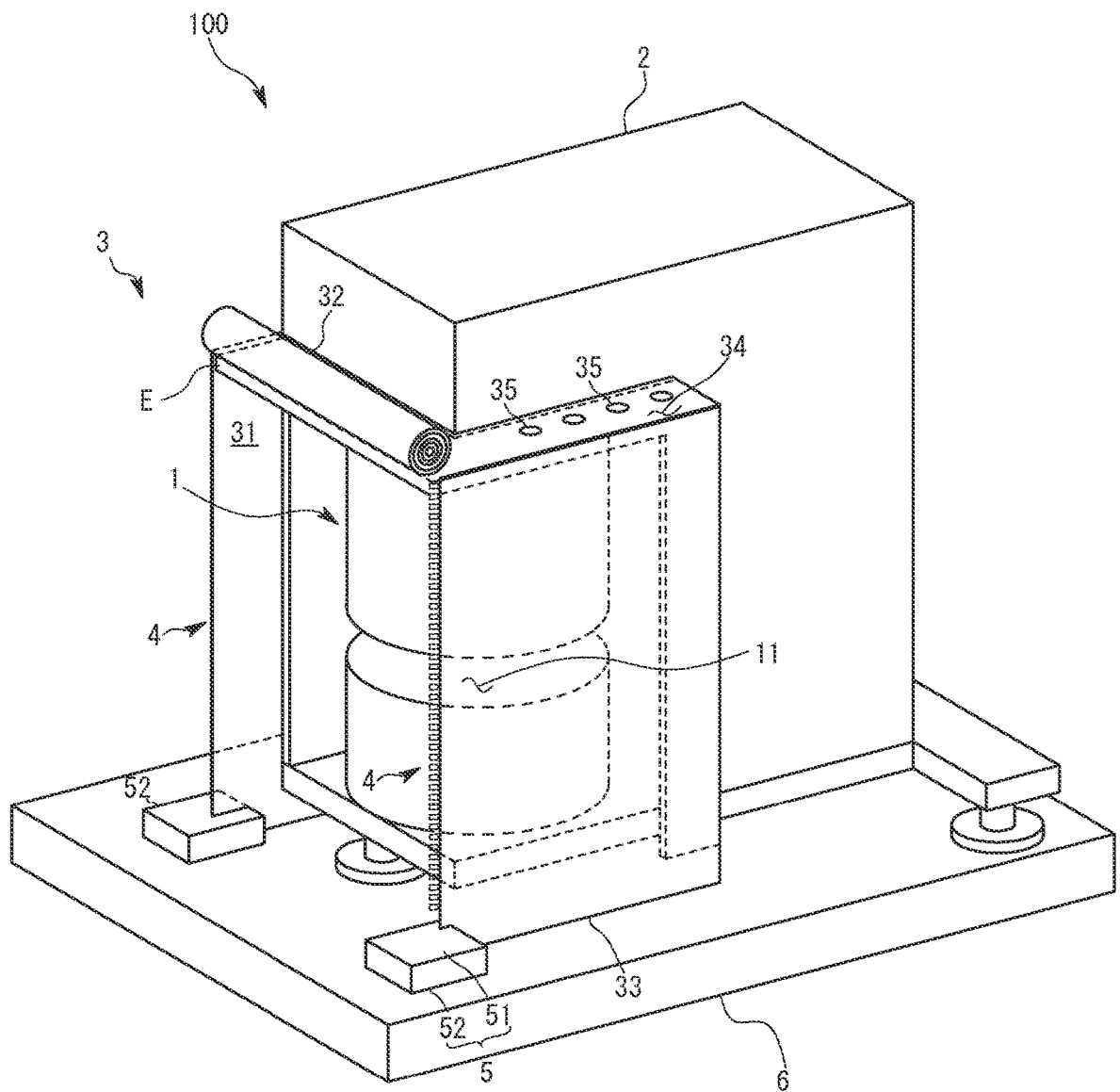
FIG. 5 is a schematic view of the laser analysis device according to the embodiment with another part of the cover rolled up.

By moving the slider 41 of each fastener 4 upward and opening the fastener 4, a coupled state of the strip shield 31, the front shield 32, and the side shield 33 can be released. As illustrated in FIG. 4, by opening the fastener 4 provided in the slit S between the front shield 32 and the side shield 33, only the side shield 33 can be rolled up to open only a side surface of the laser analysis unit 1. As illustrated in FIG. 5, by opening each fastener 4 provided in each slit S, only the front shield 32 can be rolled up to open only a front surface of the laser analysis unit 1. Although not illustrated, the entire laser analysis unit 1 can be exposed to outside by rolling up all the shields. In this manner, the laser analysis unit 1 can be operated and the sample W can be replaced by opening a part or substantially entirety of the cover 3.

In the laser analysis device 100 according to the embodiment, as illustrated in FIG. 1, an interlock mechanism 5 using the slider 41 of each fastener 4 is configured. The interlock mechanism 5 introduces laser light having a predetermined intensity or more into the laser analysis unit 1 only when each fastener 4 is completely closed and the periphery of the laser analysis unit 1 is sealed with the black shielding cloth. Conversely, when even one of the fasteners 4 is not completely closed, the interlock mechanism 5 does not introduce laser light having the predetermined intensity or more into the laser analysis unit 1. In the interlock mechanism 5, when even one of the fasteners 4 is not completely closed, for example, a laser light source is turned off, a shielding plate is disposed on an optical axis of the laser in the optical system container 2 for the laser light not to be introduced into the laser analysis unit 1, or an ND filter (light reducing filter) is disposed on the optical axis of the laser in the optical system container 2 for the laser light having an intensity lower than a predetermined intensity to be introduced into the laser analysis unit 1.

Specifically, the interlock mechanism 5 includes a key 51 provided on the slider 41 of each fastener 4, a detector 52 that detects a state where the fastener 4 is fully closed and is provided at a position where the key is contactable in the state where the fastener 4 is fully closed, and a determiner (not illustrated) that switches an interlocked state of introduction of a laser into the laser analysis unit 1 on the basis of an output of the detector 52.

The key is attached to, for example, a handle of the slider 41, and is inserted into a key hole provided in the detector 52.

The detector 52 is configured such that the slider 41 of the fastener 4 moves to the lower end, and the key 51 fits to a deepest part of the key hole only in a state where the fastener 4 is completely closed. As illustrated in FIGS. 1 and 3, in the embodiment, the detector 52 is provided, as a separate body from the laser analysis unit 1 and the optical system container 2, on a surface plate 6 on which the laser analysis unit 1 and the optical system container 2 are placed. Therefore, force and vibration generated when the fastener 4 is completely closed by an operator and the key is inserted into the key hole can hardly act on the laser analysis unit 1 and the optical system container 2.

As described above, in the laser analysis device 100 according to the embodiment, by opening and closing the fasteners 4 provided in the cover 3, the laser analysis unit 1 can be switched between a state in which the periphery is completely covered with the black shielding cloth and a state in which at least a part of the laser analysis unit 1 is opened. Since the slits S of the cover 3 is closed by fully closing the fasteners 4, it is possible to prevent a situation where the cloth twists to form a gap, and the laser that has become stray light exits from the cover 3 to outside as in a case where the cover 3 is closed with buttons, for example. That is, without fully housing the laser analysis unit 1 in a hard housing including resin or sheet metal as in the related art, the cover 3 including a flexible cloth can achieve a laser shielding state required for safety class 1.

Further, in order to release the interlock, the entire fastener 4 is completely closed, and the key is inserted into the detector 52. This configuration makes it hard to generate an impact of a magnitude generated when a door is brought into contact with a detection unit to detect opening and closing of the door as in the related art. When the cover 3 touches the laser analysis unit 1, a large force is less likely to act on the laser analysis unit 1 because the cover 3 is made of cloth. Therefore, a large impact or force is not transmitted to the laser analysis unit 1 disposed inside the cover 3 or the optical system container 2 connected to the cover 3, and an optical system can be prevented from being displaced due to the impact. As a result, it is possible to prevent an analysis error from occurring due to the release of the interlock as in the related art.

By opening the fastener 4 provided in the slit S of the cover 3 to open at least a part of the cover 3, the operator can access the laser analysis. At this time, since a part of the cover 3 can be rolled up as illustrated in FIGS. 4 and 5, the opening 11 for the operator to access the laser analysis unit 1 can be formed larger than the cover 3. Therefore, the operator can easily access the laser analysis unit 1 even through the glove box.

Other embodiments will be described.

Figure 6:
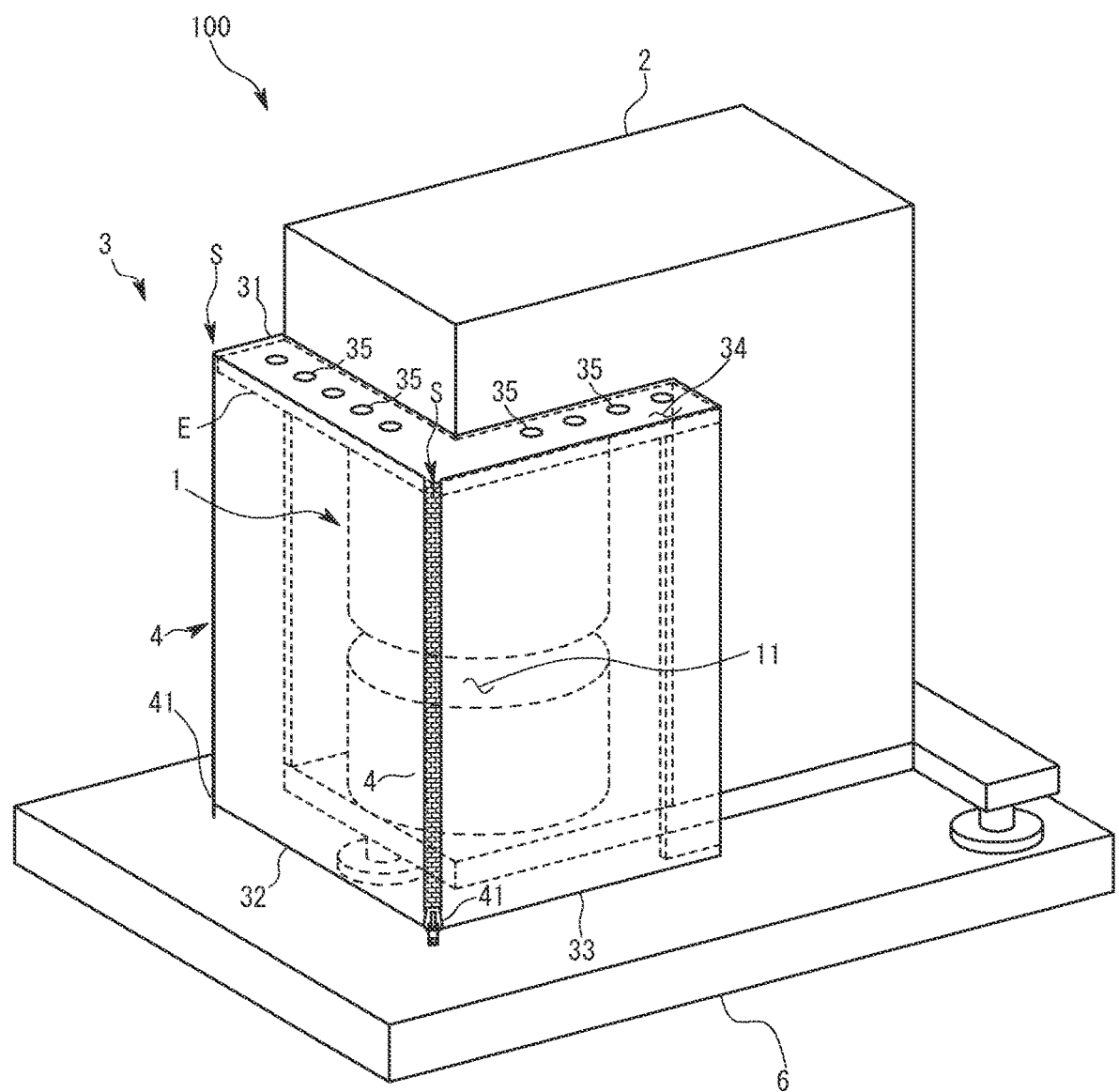
FIG. 6 is a schematic diagram of a laser analysis device according to another embodiment of the present invention.

In the laser analysis device 100 of the present invention, the interlock mechanism may be omitted as illustrated in FIG. 6, and the cover 3 having flexibility may be provided near the laser analysis unit 1. Here, "near" refers to, for example, a state in which the laser analysis unit 1 and the cover 3 are separated from each other by a predetermined distance to such an extent that it is difficult to perform analysis with a user in between.

Figure 7:
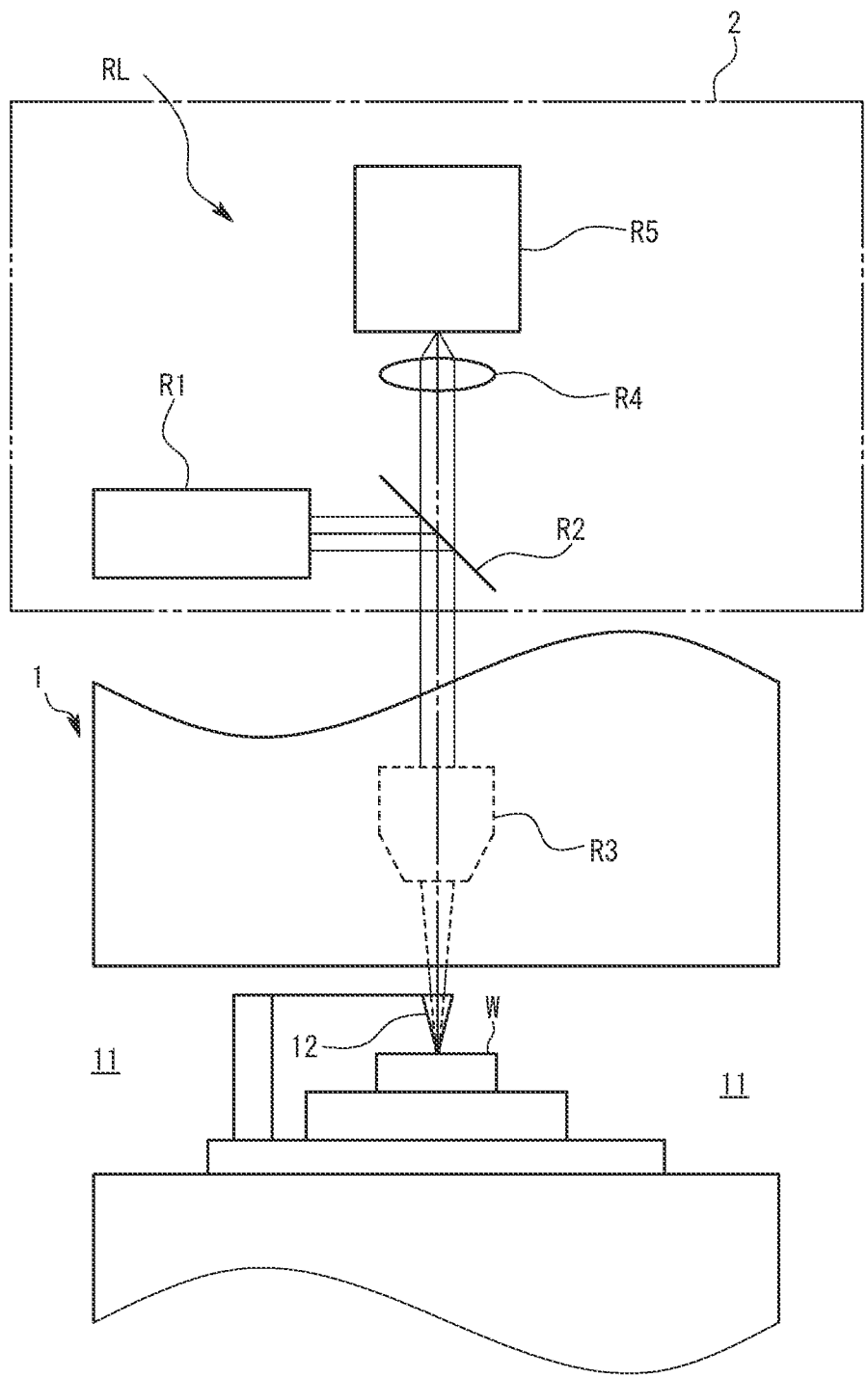
FIG. 7 is a schematic diagram of a laser analysis unit according to another embodiment.

As illustrated in FIG. 7, the laser analysis unit 1 is provided with optical instruments constituting a part of an optical system RL for performing Raman spectroscopic analysis, and includes a probe 12 provided in proximity to or in contact with the sample W.

The optical system RL includes a laser light source R1, a half mirror R2, an objective lens R3, a condenser lens R4, and a photodetector R5. Only the objective lens R3 is provided in the laser analysis unit 1. The laser light emitted from the laser light source R1 and reflected by the half mirror R2 is condensed by the objective lens R3 and emitted to the sample W placed on a stage. The cover 3 is closed to prevent the laser light from, for example, being scattered by the sample W and leaking from the opening 11 of the laser analysis unit 1 to outside. The optical instruments other than the objective lens R3 are housed in the optical system container 2.

The probe 12 provided on the stage is used, for example, to detect an interatomic force between the probe 12 and the sample W and map a surface shape or the like of the sample W on the basis of a value of the interatomic force. A part of another optical system for optically detecting a displacement of the probe 12 may be further provided in the laser analysis unit 1.

In the laser analysis device 100 configured as described above, in a state where the fastener 4 provided in the slit S of the cover 3 is opened, after the sample W is disposed at a position where the probe 12 is proximity to or in contact with the sample W through the opening 11 of the laser analysis unit 1, it is possible to prevent external light and airflow from affecting the probe 12 only by closing the cover 3. When the cover 3 is closed, vibration hardly occurs, and an analysis error due to shaking of the laser analysis unit 1 or the like can be suppressed. Note that, since laser safety standards vary depending on countries, even if there is no interlock mechanism, it is possible to sell or use the laser analysis device 100 when only laser light with low intensity is used in the laser analysis unit 1.

The laser analysis device of the present invention is not limited to AFM and Raman. For example, the laser analysis device may perform only Raman spectroscopic analysis, or may perform laser-induced fluorescence analysis, absorption analysis using light of laser transmitted through a sample, or the like. The present invention can be applied to any laser analysis device including a laser analysis unit that a sample is irradiated with laser light. The laser analysis device may separately include, for example, a measurement system other than a probe. For example, a microscope or another measurement system may be provided.

A flexible material can be used for the cover, and a flexible resin or the like can also be used instead of a cloth. The material constituting the cover does not have to have flexibility. That is, in the embodiment, each shield may be formed of a hard resin plate or a metal plate, and a fastener may be provided to open and close the slit between each shield. The fastener (line fastener) is not limited to the fastener described in the embodiment, and may be, for example, a type of fastener in which a projecting stripe is continuously fitted into a recessed groove by moving a slider.

The attachment position of the detector constituting the interlock mechanism is not limited to the surface plate, and may be another place. For example, the detector may be attached to a part of the laser analysis unit, or the detector may be attached to the housing of the optical system container. In short, it is sufficient that the key provided on the slider of the fastener can come into contact with the detector only in a state where the fastener is fully closed and the cover is fully closed.

Further, a method of detecting the key by the detector is not limited to a method in which the key is inserted as in the embodiment. The detector may be configured to detect a fully closed state of the fastener simply upon contact of the key. In addition, the key may be attached to the slider of the fastener, or the slider may be used as the key.

A method of detecting the fully closed state of the fastener is not limited to a method in which the key directly contacts the detector. That is, the detector may be configured to indirectly detect the key or to contact the key in a non-contact manner. For example, an interposer may exist between the key and the detector, and the detector may detect the fully closed state of the fastener when the key comes into contact with the interposer.

A light source may be provided in the slider of the fastener, and the fully closed state may be detected by detecting light emitted from the light source with the detector. For example, the intensity of the light emitted from the light source may be set such that the light is detected by the detector only when the fastener is in the fully closed state. Alternatively, a threshold for determining that the detector is in the fully closed state may be set to detect only the fully closed state. Note that various kinds of light such as laser light and infrared light can be used as the light emitted from the light source.

In addition, instead of providing the light source on the slider of the fastener, for example, the light source and the detector may be provided on the surface plate or the like, and the slider of the fastener in the fully closed state may be disposed on an optical axis of the light source, and the fully closed state may be detected depending on whether or not light is incident on the detector.

The slit provided in the cover is not limited to the slit provided at the corner. For example, a slit may be formed at a center or the like of each shield of the cover and be provided with a fastener, and a hole may be formed in the shield when the fastener is opened. The fixed end of the cover is not limited to the fixed end fixed to the flange provided in the laser analysis unit or the optical system container. For example, a support member to which the cover is fixed may be separately provided on the surface plate, and the laser analysis unit may be configured to be wrapped by the cover from all directions.

The laser analysis device may include a laser analysis unit that a sample is irradiated with laser light, a cover that has flexibility, covers a periphery of the laser analysis unit so as to prevent laser light from being emitted to outside, and has a slit in at least a part of the cover, an opening and closing mechanism configured to open and close the slit, and an interlock mechanism including a detector that detects a state in which the opening and closing mechanism is fully closed, in which in a state where the detector has detected that the opening and closing mechanism is fully closed, laser light having a predetermined intensity or more is introduced into the laser analysis unit. Specific examples of the opening and closing mechanism are not limited to fasteners, but include hook-and-loop fasteners, magnets, buttons, and the like.

In addition, various modifications of the embodiments and combinations of some of the embodiments may be made without departing from the gist of the present invention.

INDUSTRIAL APPLICABILITY

The present invention can provide a laser analysis device configured such that a protection mechanism for preventing exposure to a human body can be opened and closed so as not to greatly impact a laser optical system.

The invention claimed is:
1. A laser analysis device comprising:
  a laser analysis unit in which a sample is irradiated with laser light;
  a cover that covers a periphery of the laser analysis unit so as to prevent the laser light from being emitted to outside, and has a slit in at least a part of the cover, wherein the cover is a black shielding cloth having flexibility;
  a fastener comprising a slider configured to open and close the slit by moving the slider along a direction in which the slit extends; and an interlock mechanism including a detector that detects a state in which the fastener is fully closed, wherein in a state where the detector has detected that the fastener is fully closed, laser light having a predetermined intensity or more is introduced into the laser analysis unit.

2. The laser analysis device according to claim 1, wherein the laser analysis unit is placed on a surface plate, and the detector is placed on the surface plate as a separate body from the laser analysis unit.

3. The laser analysis device according to claim 1, wherein the cover has the slit extending in an up-down direction at a plurality of locations, and the slit is respectively provided with the fastener.

4. The laser analysis device according to claim 1, wherein the laser analysis unit includes at least one opening that communicates with outside from a point where a sample is irradiated with laser light.

5. The laser analysis device according to claim 1, wherein the fastener includes elements that mesh with one another by a movement of the slider toward a fully closed position to close the slit.

6. The laser analysis device according to claim 1, wherein the detector of the interlock mechanism detects a state of the slider to determine when the fastener is fully closed.

7. A laser analysis device comprising:

a laser analysis unit that a sample is irradiated with laser light;

a cover that has flexibility, covers a periphery of the laser analysis unit near the laser analysis unit so as to prevent the laser light from being emitted to outside, and has a slit in at least a part of the laser analysis unit, wherein the cover is a black shielding cloth having flexibility; and a fastener comprising a slider configured to open and close the slit by moving the slider along a direction in which the slit extends.

8. The laser analysis device according to claim 7, wherein the laser analysis unit further includes a probe disposed to be in contact with or in proximity to the sample.

\* \* \* \* \*